Nov. 5, 1963  J. T. MULLER  3,109,383
METERING DEVICE
Filed May 8, 1961

INVENTOR.
John T. Muller
BY
March and Curtiss
ATTORNEYS

3,109,383
METERING DEVICE
John T. Muller, 50 West Lawn Road, Livingston, N.J.
Filed May 8, 1961, Ser. No. 108,377
1 Claim. (Cl. 103—149)

This invention relates to small liquid metering apparatus, and more particularly, to continous flow metering devices of the liquid type wherein flexible-walled tubing is employed in conjunction with rotary, pinch or squeeze members which effect a traveling pinch of the tubing to impel liquid therethrough at a predetermined rate.

An object of the invention is to provide a novel and improved metering device of the type wherein there is a coiled, flexible-walled tube and a rotary pressure member adapted to effect a traveling pinch of the tube, which device is extremely simple in its construction, involving an absolute minimum number of parts.

Another object of the present invention is to provide a metering device which will deliver exact predetermined quantities of a liquid at specific predetermined time intervals.

Still another object of the invention is to provide an improved metering device construction as above set forth, which is efficient and reliable in its operation.

A further object of the invention is to provide an improved continuous flow metering device in accordance with the foregoing, wherein the parts may be readily and economically fabricated, utilizing existing mass-production equipment.

Still another object of the invention is to provide an improved continuous flow metering device of the type specified, which is especially compact and may be made in very small sizes, and which may be of light weight, adapting it to uses where these factors are of advantage.

Yet another object of the invention is to provide an improved continuous flow metering device as above characterized, which has a maximum degree of accessibility, and which may be easily repaired and/or serviced.

A feature of the present invention is the provision of an improved, continuous flow metering device in which the tube through which the liquid flows may be removed with ease and facility for cleansing or replacement purposes and which may be readily re-assembled after such operations.

Other objects and advantages will hereinafter appear.

In the accompanying drawings, the invention has been shown merely by way of example and in preferred form and obviously many variations and modifications thereof may be made, without departing from its spirit, which will still be comprised within its scope. It is to be understood, therefore, that the invention is not limited to any specific form or embodiment, except insofar as such limitations are set forth in the appended claim.

Referring to the drawings.

Figure 3:
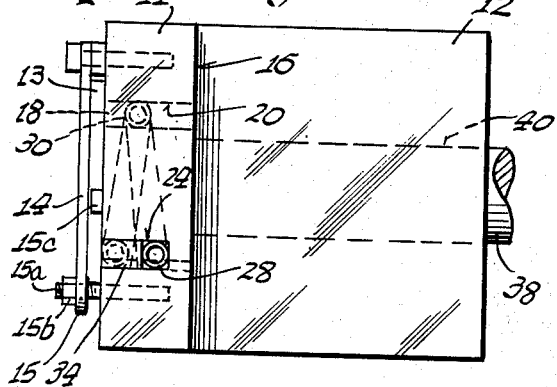
FIG. 3 is a side elevational view of the metering device of FIG. 1 with the rotor thereof in the position of FIG. 1.

As shown, the liquid metering device of the present invention comprises a housing or body 10 which is constituted in the main of a single or one-piece block of material and comprises preferably several rectangular formations or portions. The body 10 may be advantageously fabricated of any suitable plastic material, as for example transparent Lucite or the like, said block having a configuration which is especially adapted for fabrication by a molding process or other plastic fabricating techniques. The housing 10 preferably has portions which are in the form of rectangular solids and are formed integral with each other, there being shown two such portions in the figures, a portion 11 which contains a metering chamber 18 (to be hereinafter described) and a portion 12 which constitutes a bearing means for a rotary member of the metering device. The rectangular portions 11 and 12 are in the form of slabs, the slab 12 being disposed edgewise and substantially perpendicular to one large surface 16 of the slab 11 as seen in FIGS. 3 and 4.

Figure 1:
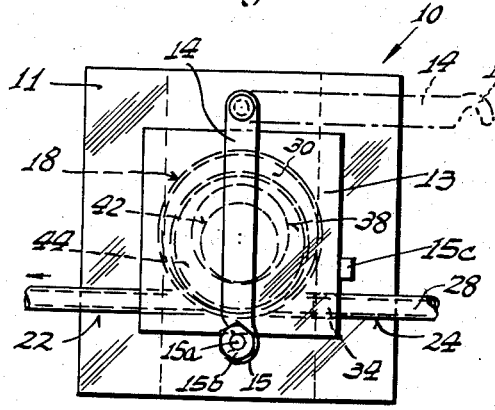
FIG. 1 is a front elevational view of the present improved metering device as provided by the invention.

According to the present invention, a removable plate 13 is disposed directly over the metering chamber 18. A bar 14 provided with a hook 15 is hingedly disposed, as shown, over the removable plate. In locked position, as shown in FIG. 1, the hook on the bar 15 engages a threaded pin 15a over which a removable nut 15b is disposed which maintains the bar in locked position when tightened, but which may be loosened, whereupon the bar can be swung away exposing the removable plate as shown in dotted lines in FIG. 1 and for the purposes hereinafter set forth. A stop 15c is also provided to prevent horizontal movement of the plate or any independent shifting thereof.

Figure 2:
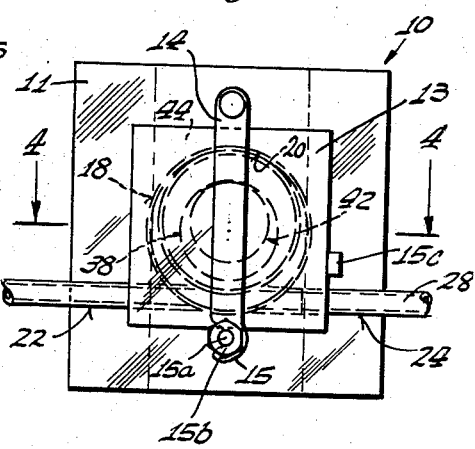
FIG. 2 is a view like FIG. 1, but showing the rotary metering means or pinching element in a different rotative position.
Figure 4:
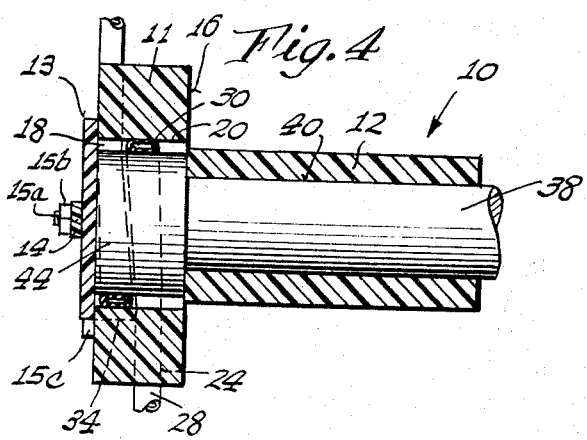
FIG. 4 is an axial horizontal section, taken on the line 4—4 of FIG. 2.

Referring to FIGS. 1, 2 and 4, the slab or block portion 11 is provided with a metering chamber 18 which has a rotary, curved pressure wall 20, said pressure wall being shown as of cylindrical configuration. The slab 11 further is formed with a pair of passages or ports 22 and 24 which are shown as substantially aligned with each other, the said passages extending through the opposite sides of the slab 12 and communicating with the chamber 18 at substantially a tangent to the curved pressure wall 20.

The metering chamber 18 and the passages 22 and 24 are so arranged as to accommodate a flexible-walled tube 28, formed of suitable resilient material such as rubber or of rubber-like nature, or else of resilient and flexible plastic. For example, the tube 28 may be constituted of polyethylene or a similar plastic material which is resistant to the action of many chemicals, acids and the like. The tube 28 has a loop or coil portion 30 which is disposed in the chamber 18, extending along and in contact with the rotary pressure wall 20 of such chamber. The tube 28 also has two straight portions leading to and from the loop portion 30, said straight portions being disposed in the passages 22 and 24 of the slab 11, as clearly shown in the drawings.

As seen in FIG. 4, the straight portions of the tube 28 are offset one from the other, and the loop portion 30 is constituted as a single turn of a helix, whereby portions thereof lie in axial side-by-side relation, as will be readily understood.

For the purpose of retaining the tube 28 in its operative position, and especially to retain one of the straight sections of such tube in the passage 24 there is provided a retainer member 34 which is carried by the removable plate and extends into one passage 24, as clearly seen in FIGS. 1, 2 and 3. The retainer member 34 encloses the respective straight portion of the tube 28 and removably secures it in the passage 24.

The metering device further comprises an eccentric driven rotor carried by a drive shaft 38 which is mounted in a bore 40 of the bearing portion or slab 12 of the housing. The shaft 38 has an eccentric portion or pin 42 formed at the end thereof disposed within the chamber 18, said pin carrying a roller 44 which has an outside diameter smaller than the inside diameter of the chamber wall 20, and the loop portion 30 of the tube 28 is disposed within said chamber between the pressure wall 20 thereof and the outer peripheral surface of the roller 44. Stated specifically, the diameter of the roller 44 is less than the inside diameter of the cylinder bore (or pressure wall 20) by an amount substantially equal to the outside diameter of the tube 28 plus twice the thickness of the wall of the tube. Thus, the size of the roller 44 is just sufficient to effect a traveling pinch of the loop portion 30 of the tube 28 as the roller revolves in response to the turning of the rotor shaft 38 and in response to the eccentric movement of the pin 42.

In FIG. 1 the roller 44 is shown as pinching the lower, side-by-side portions of the tube 28, i.e., where the straight sections of such tube meet the curved or looped section 30 of the tube. In FIG. 2 the rotor is shown as having been turned through an arc of 180°, whereby the eccentric pin 42 is now at the top of the stroke compared with its bottom position shown in FIG. 1. Thus, in FIG. 2, the roller 44 is pinching and compressing the uppermost portion of the loop 30 of the tube 28. Partially compressed or pinched will be side portions of the loop 30, as may be seen in FIG. 4.

It will now be understood from the above description, in conjunction with the showing of the figures, that rotation of the rotor comprising the shaft 38, pin 42 and roller 44 in the direction of the arrows of FIGS. 1 and 2 will effect a successive clockwise or traveling pinch of the loop portion 30 of the tube 28. Any liquid which is disposed in such loop portion will accordingly be impelled through the same in a clockwise direction as viewed in FIGS. 1 and 2, and such liquid will as a consequence be forced through the left straight section of the tube 28, in the direction of the arrow located adjacent such straight section. The rotor shaft may be coupled to any suitable driving means and is driven at a predetermined rate for the metering of liquid, as for example, chlorine, in predetermined measure and time sequences with a water circulating system for a swimming pool.

A quantity of liquid delivered by the device of the present invention is independent of the discharge pressure and will remain constant from zero to maximum operating pressure.

Loss of liquid due to by-passing is compensated for by the increase in diameter of the tube itself under liquid pressure. With this arrangement and flexible tubing, the liquid seepage is therefore compensated for by the expansion of the tubing itself under operating conditions.

Heretofore, great difficulty has been encountered in removing the tube as is necessary for cleansing and replacement purposes. These difficulties have been overcome by the metering device of the present invention in the utilization of which it is only necessary to loosen the nut 15b and pivot the bar 15 away from the removable plate 13. Thereafter, when the plate is removed, the tube is completely exposed and may be withdrawn for cleansing or replacement purposes. For reinsertion, it is only necessary to place the tube in the passage 24 and thread it adjaecnt to the curved pressure wall 20. It has been found that when the shaft is activated during the reinsertion operation, the tube will easily become disposed intermediate the chamber wall 20 and the roller 44 into the form of a loop whereupon the leading portion of the tube may be inserted in the passage 22 and the device will be ready for use upon reinsertion of the plate and attachment of the locking bar. This unique yet simple arrangement permits of the ready removal and replacement of the tube which, from time to time, may become clogged and block the passage of the liquid through the metering device. It has been found that the construction presented overcomes the difficulties heretofore incurred in the essential removal and replacement of the liquid carrying tube.

From the foregoing, it will now be appreciated that I have provided a novel continuous flow metering device construction of the type involving a flexible, resilient walled tube wherein a loop portion is successively pinched in a circular path, the said metering device being of extremely simple nature, and involving an absolute minimum number of parts which may be readily and economically fabricated with existing mass-production equipment. For example, the housing 10 may be fabricated of molded plastic, all in one piece except for the retainer member 34. The rotor comprising the shaft 38, the pin 42 and roller 44 may also be fabricated of suitable material such as plastic, metal or the like, depending on the requirements and conditions of use. By virtue of the few parts involved, the manufacture and assembly of the metering device may be economically effected. Moreover, the construction shown is small and of compact arrangement, and capable of being fabricated of light materials, whereby it has but little weight. The unit is efficient and reliable in its operation, with the quantity of liquid and the time sequence of the impelling of the liquid being very accurately predetermined. The working parts of the device are readily accessible whereby they may be easily repaired and/or serviced and, moreover, when made of transparent material its functioning may be viewed and examined while in operation, thus enabling defects and malfunctioning to be detected.

As already stated, many variations and modifications may be made which will still be comprised within the spirit of the invention and the scope of the appended claim.

Having thus described my invention, what I claim is:

A metering device comprising
(a) a block housing having a smooth outer surface, said housing having a cylindrical chamber extending axially therethrough, said chamber extending normal to said surface,
(b) a shaft mounting block having a bore extending therein connected to said housing block,
(c) a shaft rotatably journaled in the bore of said shaft mounting block,
(d) a rotor mounted eccentrically of said shaft,
(e) said rotor being housed within said chamber,
(f) said housing block having a pair of opposed passages defining an inlet and outlet to said chamber,
(g) said inlet and outlet being disposed substantially tangent to the circumferential wall of said chamber, and
(h) said inlet and outlet being laterally displaced axially of said block,
(i) a flexible-walled tube having its ends disposed in said inlet and outlet and its intermediate portion disposed in a loop about said rotor and against the circumferential wall of said chamber, the diameter of said rotor being less than the diameter of the chamber by an amount substantially equal to the outside diameter of the tube plus twice the thickness of the tube wall, whereby rotation of said rotor effects a traveling pinch of said tube to impel any fluid disposed within the tube,
(j) a removable plate fitted flush against said surface to seal said chamber.

(k) retainer means connected to said removable plate for retaining the end of said tube in said inlet,
(l) and means for releasably locking said plate to said block,
(m) said latter means including a bar pivotally mounted at one end to said block to pivot between operative and inoperative position,
(n) said bar having a hook formed on the free end thereof,
(o) and a locking nut for engaging said hooked end to securely clamp said plate in place on said housing block.

References Cited in the file of this patent

UNITED STATES PATENTS

| | | |
|---|---|---|
| 1,845,479 | Carpenter | Feb. 16, 1932 |
| 2,403,572 | Wittenberg | July 9, 1946 |
| 2,651,264 | Bruckmann | Sept. 8, 1953 |
| 2,898,859 | Corneil | Aug. 11, 1959 |

FOREIGN PATENTS

| | | |
|---|---|---|
| 439,907 | Great Britain | Sept. 25, 1934 |